(12) United States Patent
Helland

(10) Patent No.: US 6,748,417 B1
(45) Date of Patent: Jun. 8, 2004

(54) AUTONOMOUS NETWORK SERVICE CONFIGURATION

(75) Inventor: Patrick J. Helland, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 09/666,572

(22) Filed: Sep. 21, 2000

Related U.S. Application Data

(60) Provisional application No. 60/213,562, filed on Jun. 22, 2000.

(51) Int. Cl.⁷ .............................. G06F 15/16
(52) U.S. Cl. ............... 709/203; 709/217; 709/218; 709/219; 705/26; 705/27; 705/37; 707/10
(58) Field of Search ................ 709/203, 217, 709/213, 218–219; 705/26, 37; 707/10; 345/745

(56) References Cited

U.S. PATENT DOCUMENTS 6,253,234 B1 * 6/2001 Hunt et al. ................ 709/213

2001/0007098 A1 * 7/2001 Hinrichs et al. .............. 705/14
2001/0007099 A1 * 7/2001 Rau et al. ..................... 705/26
2002/0103712 A1 * 8/2002 Rollins et al. ................ 705/26
2002/0154162 A1 * 10/2002 Bhatia et al. ............... 345/745

* cited by examiner

*Primary Examiner*—Hosain Alam
*Assistant Examiner*—Thu Ha Nguyen
(74) *Attorney, Agent, or Firm*—Workman Nydegger

(57) ABSTRACT

The present invention liberates service provider architecture by allowing the primary logic component that manages the live data to be autonomous from the client interactive logic components. The client interactive logic components have reference data and single user writable data and are charged with interacting with the client and with forming request that will be recognized by the primary logic component. However, unlike the conventional architecture, requests submitted from the client interactive logic components are not trusted by the primary logic component. Instead, information within the request is validated for accuracy before the request is honored. The service provider also assists in handling requests based on stale data by the client interactive logic component generating formal requests that are commutative and business service oriented, and by the primary logic component having policies that recognize the existence of stale data.

55 Claims, 7 Drawing Sheets

AUTONOMOUS NETWORK SERVICE CONFIGURATION

BACKGROUND OF THE INVENTION

CROSS-REFERENCE TO RELATED APPLICATIONS

The present invention claims priority from U.S. provisional patent application serial No. 60/213,562 filed Jun. 22, 2000 and entitled "Distributed Computing Services Platform" which provisional application is incorporated herein by reference in its entirety.

THE FIELD OF THE INVENTION

The present invention relates to the field of network computing. More particularly, the present invention relates to methods, systems, and data structures for-supporting a flexible autonomous network service configuration architecture.

THE PRIOR STATE OF THE ART

Network technology such as the Internet has revolutionized the way people communicate and do business and promises to have a major impact on the world's future. A host of Internet sites now offer services that are provided to clients upon request. Such services might include, for example, the making of a flight reservation, the ordering of a book, the selling of a stock, and much more. The providing of such services over the Internet now constitutes a major part of the economy. Still, it is anticipated that these network services will become even more in demand in the future.

The profitability of businesses that offer such services is largely dependent on how the software applications that provide the service are designed. A poorly designed application program can result in lost business opportunities, squandered good will, and other detriments. In contrast, a well designed application program can foster positive consumer sentiment and a healthy financial situation. In light of the promise shown of network services and the reliance of network services on good software design, it would represent a significant advancement in the art to provide technologies that enhance the way people design software applications that support network services.

FIG. 1 illustrates the relevant features of what is understood to be the current state of the art with regards to the network design of service providers. A service provider 110 provides a service to client groups 120 (e.g., client groups 120a through 120n) that reside outside of the trust boundary 130 of the service provider. The service provider 110 does not trust information provided from entities such as clients 120 that reside outside of the trust boundary 130. In other words, the service provider 110 does not rely on such externally provided information being accurate and thus independently verifies such information.

On the other hand, the internal components of the service provider 110 generally trust information provided internally between them as they are all within the trust boundary. Such internally provided information may be verified to make sure that the information was properly transmitted internally. However, the internally provided information is not verified for accuracy since the components internal to the service provider 110 are trusted to each other. In essence, although internal errors may occur, the components within the service provider 110 can depend on the other internal components not being malicious. The same cannot be said of the clients 120.

The service provider 110 includes current data source 111, which stores the mission-critical data that reflects the accurate and most up-to-date state of the service. For example, if the service provider is an on-line video store, the current data may include an up-to-date listing of the videos offered for sale as well as the quantity of each video in stock. A primary logic component 112 encapsulates the current data source 111 so that only it directly accesses the current data source.

The service provider also includes client interactive logic components 111a through 113n that interact with client groups 120a through 120n, respectively. Each client interactive logic component includes reference data 114 (e.g., 114a through 114n, respectively), and single user writable data 115 (e.g., 115a through 115n, respectively). The reference data is based on the current data and is used in the interactions with the client. The single user writable data for a particular client interactive logic component includes user data for the client group with which the particular client interactive logic component communicates. Only the client itself affects single user writable data having to do with that client. A classic example of single user writable data is shopping cart data electronically representing items the user has selected for purchase.

Each client interactive logic component 113 interacts with a client 120 by receiving requests from the client 120, transmitting reference data to the client as appropriate, and generating requests for the primary logic component 112. For example, in the on-line video store example, a client may transmit a request to view a selection of videos. In response, the client interactive logic component may extract a list of videos from the reference data and transmit the list to the client. The client may then send a request to purchase an item within the list. During this interaction, the client interactive logic component may extract user data from the client-originated messages. This single user writable data may include buyer name, buyer address, credit card number, shipping address, item ordered, quantity ordered, and any other relevant information specific to the user that may be helpful in completing the service or transaction.

The client interactive logic component 113 then generates a formal request for services recognized by the primary logic component 112 by using the appropriate fields from the reference data (e.g., item number and title) and from the single user writable data (e.g., quantity ordered, shipping address and buyer name). The primary logic component 112 would then cause the shipment to be processed and would update the current data to reflect the change in inventory levels.

The primary logic component 112 periodically updates the reference data by transmitting updates to the client interactive logic components 113. The updates are based on the current data as the current data existed at a previous instant in time. If the reference data was too out of date, the client may make a request that cannot be fulfilled due to changes in the current state of the service. For example, in the on-line video business example, the client may request to purchase a certain video that was indicated to be available but has become unavailable since the reference data was last updated. In this case, the request would fail thereby harming the good will of the service provider.

In order to guard against such harm in conventional service provider architectures, updates are provided to the reference data frequently enough that the risk of data mismatch between the reference data and the current data is minimized to a level acceptable to the service provider. This frequent updating of potentially large volumes of reference data means that the communication bandwidth between the primary logic component 112 and the client interactive logic components 113 should be relatively high.

In summary, in the conventional network service architecture, the primary logic component 112 that manages the current data trusts the client interactive logic components 113 that interact with the client 120. Furthermore, the primary logic component 112 provides frequent updates to the reference data so as to avoid errors based on staleness of the reference data. Since it is easier to maintain trust and maintain high bandwidth in tightly coupled networks where the network is physically consolidated, there is a strong motivation to tightly couple and physically consolidate the conventional network service configuration of a service provider.

Although such tight integration has its advantages in conventional network service architectures, it will become clear from this description that it would represent a revolutionary advancement in the state of the art to provide a network service architecture that is not constrained by such tight integration.

SUMMARY OF THE INVENTION

The present invention liberates service provider architecture by allowing the primary logic component that manages the live current data of the service provider to be autonomous from the client interactive logic components. The client interactive logic components have reference data and single user writable data and function to interact with the client and form formal requests that will be recognized by the primary logic component.

However, unlike the conventional architecture, formal requests submitted from the client interactive logic components are not trusted by the primary logic component. Instead, information within the formal request is validated for accuracy before the request is honored. Since the primary logic component does not rely on the accuracy of information provided by the client interactive logic components, the service provider need not ensure that the client interactive logic components provide accurate information. Accordingly, this liberates the client interactive logic components and the primary logic component from needing to run in a common sphere of trust.

Further flexibility may be obtained by the client interactive devices generating requests that are commutative. In other words, the requests specify the desired service in an abstract manner so that the ordering of request handling may be adjusted as needed to reduce the chanced that a request will be denied. This gives the primary logic component flexibility on how to handle a group of requests so as to avoid request conflict when the requests are based on stale reference data.

The service provider also assists in handling requests based on stale data by establishing policies that recognize the existence of stale data. For example, suppose that a hotel reservations service provider publishes room rates as reference data. Now suppose that the room rates are updated in the reference data every week. If the room rates in the current data are updated daily, the client interactive logic component may likely have stale reference data at any given time. In order to deal with this stale data, the service provider would have policies that accept requests in which the room rate extracted from outdated reference data is as old as two weeks. This avoids the situation where the hotel reservation service provider publishes room rates that are not ultimately honored by the hotel reservation service provider.

By alleviating the primary logic component from having to trust the client interactive logic components and by allowing for more staleness in the reference data of the client interactive logic components, there is more flexibility on where the client interactive logic components are located and how they relate to the primary logic component. In other words, although the client interactive logic component may be located on the same server or local area network as the primary logic component, the client interactive logic component also has the flexibility to be remotely located from the primary logic component. For example, the client interactive logic component may run on a Web farm associated with the client, on the same local area network as the client, or even on the same machine as the client, even though the client is remote from the primary logic component. The client interactive logic component may even be remotely downloaded from a remote service provider for local execution on a lap top computer without changing the code of the client interactive logic component. In this case, the client interactive logic component may interact with the client while the client is off line.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
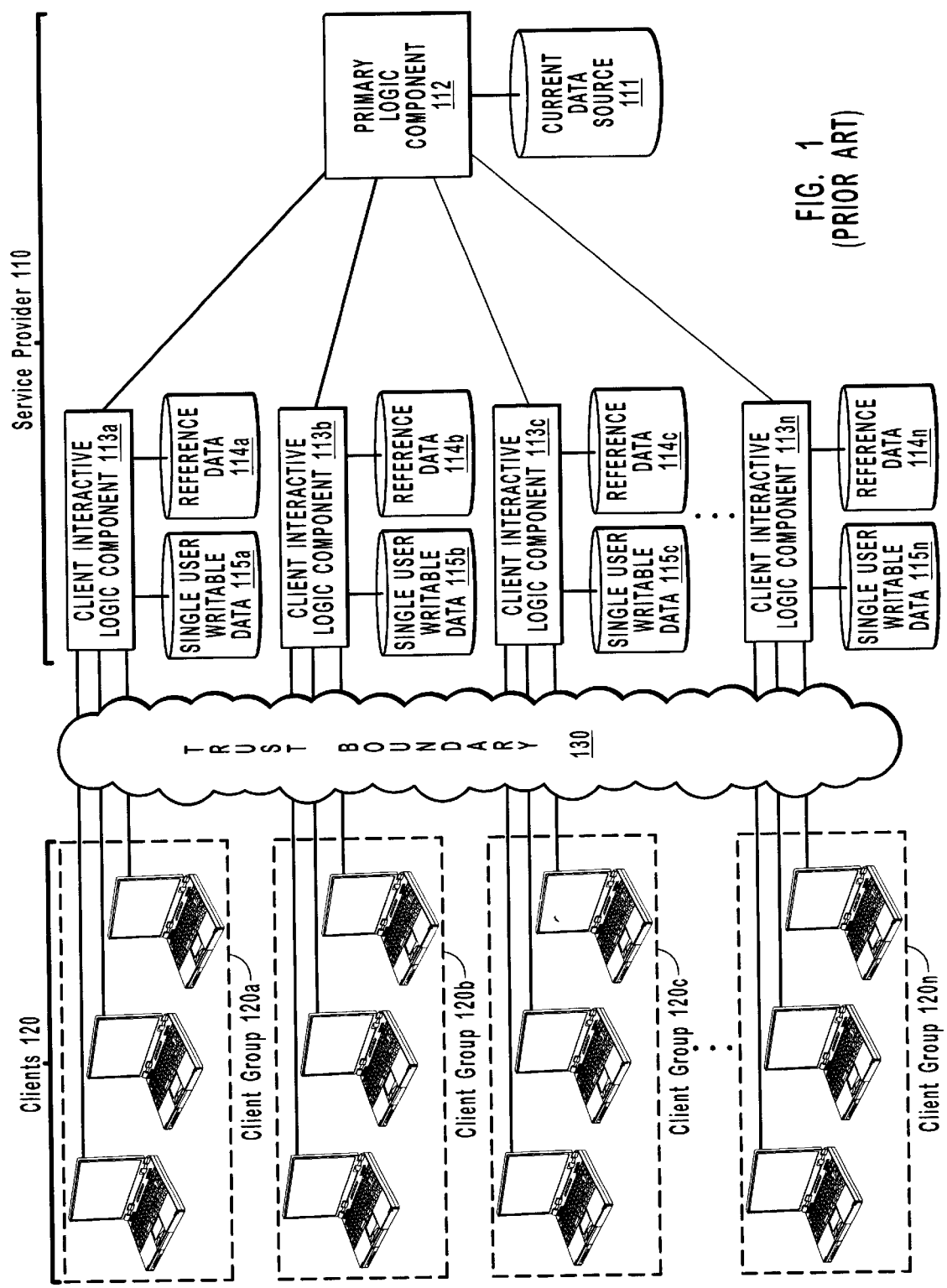
FIG. 1 illustrates a service provider architecture in accordance with the prior art in which a trust boundary separates the service provider from the clients served.

The present invention extends to methods, systems and data structures for supporting a flexible network service architecture. In the architecture, the primary logic component that directly accesses the current data of the service provider is less coupled or even entirely autonomous from the client interactive logic components of the service provider.

The trust between the primary logic component and the client interactive logic components is reduced or even eliminated entirely allowing the primary logic component to reside in a different sphere of trust from the client interactive logic components. In addition, the architecture allows for the reference data at the client interactive logic components to be relatively stale without significantly diminishing service provider performance. Thus, the primary logic component is relieved of the burden of providing frequent updates of reference data to the client interactive logic components.

In this manner, the coupling between the client interactive logic components and the primary logic component is significantly weakened thereby allowing the client interactive device more flexibility on how the client interactive logic components are network connected to the primary logic component. This flexibility allows the client interactive logic device to be remote from the primary logic device and connected over a lower bandwidth connection, if desired.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Although not required, the invention will be described in the general context of computer-executable instructions, such as program components, being executed by computers in network environments. Generally, program components include routines, programs, objects, modules, data structures, and the like that perform particular tasks or implement particular abstract data types. Computer-executable instructions, associated data structures, and program components represent examples of the program code means for executing steps of the methods disclosed herein. The particular sequence of such executable instructions or associated data structures represents examples of corresponding acts for implementing the functions described in such steps.

Figure 2:
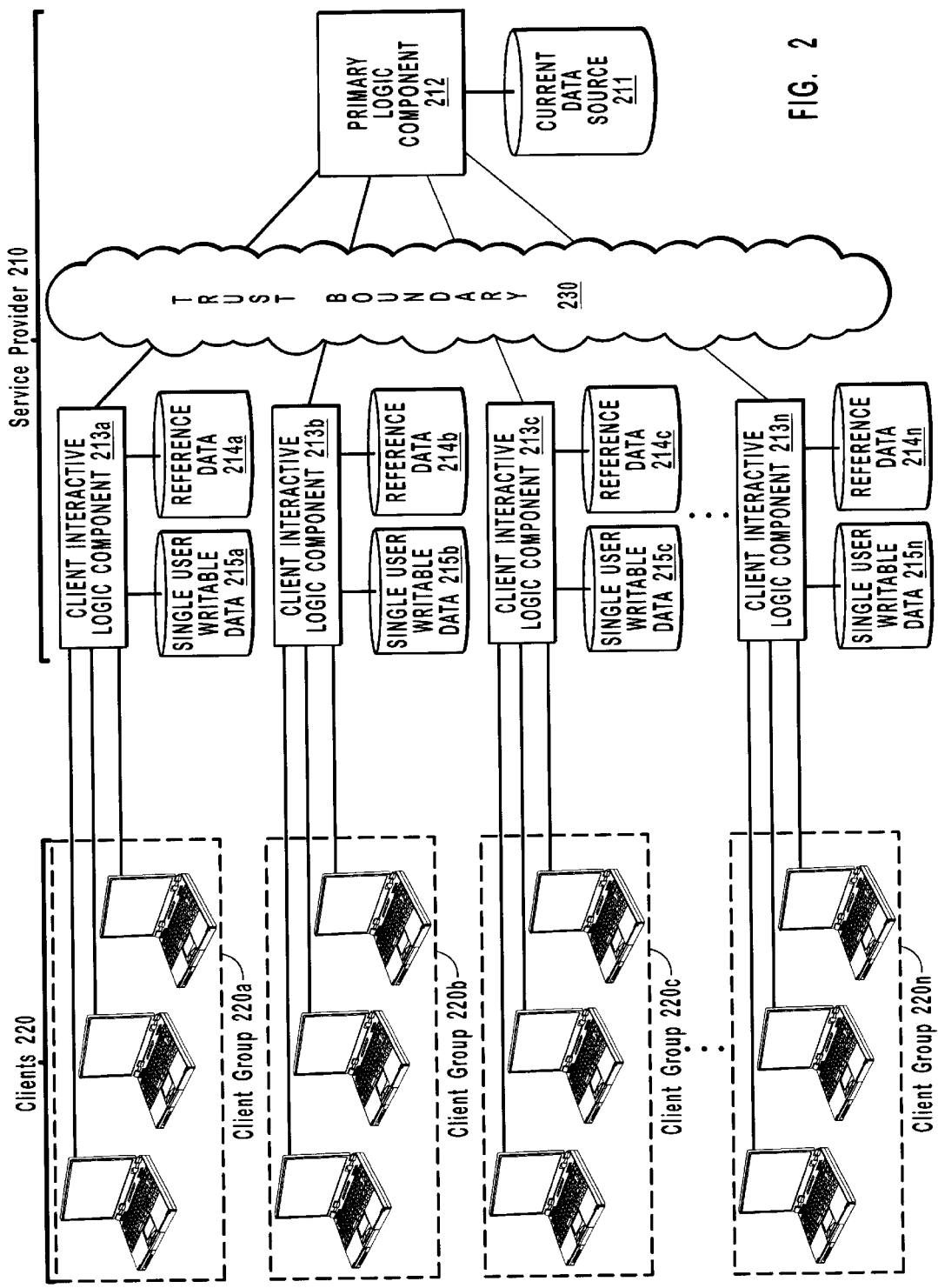
FIG. 2 illustrates a service provider architecture in accordance with the present invention in which a trust boundary separates the primary logic component and the client interactive logic components of the service provider.

FIG. 2 illustrates a network service architecture in accordance with the present invention. In contrast to the conventional architecture of FIG. 1, a trust boundary 230 is situated between the primary logic component 212 and the client interactive logic components 213. The primary logic component 212 does not even rely on the accuracy of information provided by the client interactive logic components 213. All incoming requests from the client interactive logic components 213 are inspected and all information is validated. Thus, even if a renegade client interactive logic component submits a request with inaccurate information to the primary logic component 212, the primary logic component 212 independently acts to determine that the information is incorrect and thus denies the corresponding request.

Figure 3:
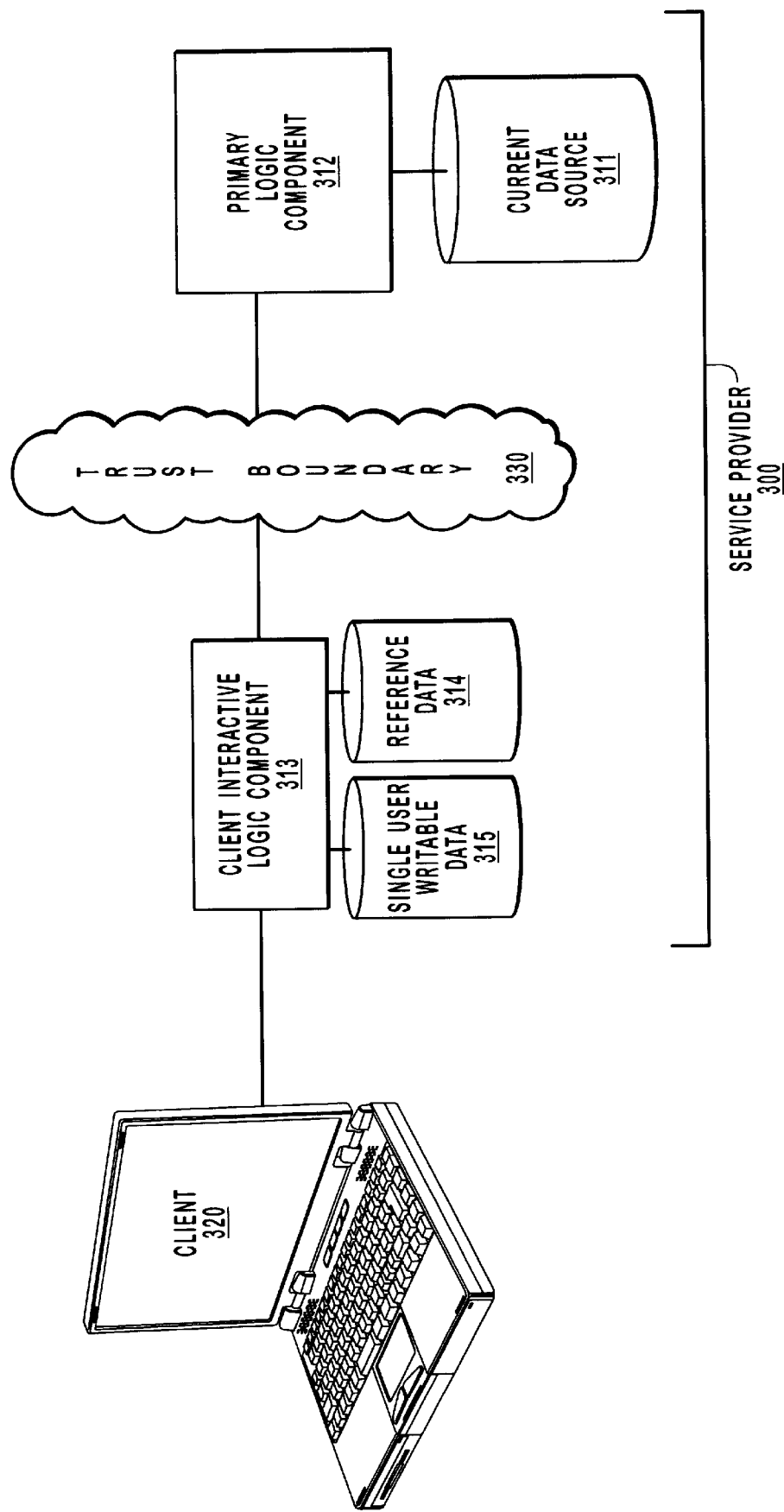
FIG. 3 illustrates the service provider architecture of FIG. 2 in simplified form for clarity.

FIG. 3 illustrates the network service architecture of FIG. 2 in simplified form with only one client interactive logic component 313 interacting with only one client 320. For clarity, the operation of the network service architecture will be described with respect to FIG. 3 although it will be apparent that more the one client interactive logic component may operate with the primary logic component, and that more that one client may interact with each client interactive logic component.

The network service architecture includes a service provider 300 that provides a service to client 320. The service provider 300 includes a primary logic component 312, which manages the current data stored in the current data source 311. In this description and in the claims, the "current data" of a service provider is the mission-critical data that reflects the accurate and most up-to-date state of the service. The primary logic component 312 controls access to the current data so that the data and information derived therefrom may only be obtained by making a request to the primary logic component, which directly accesses the current data if appropriate. The primary logic component may then grant or deny the request.

The service provider 300 also includes client interactive logic component 313 which interacts with client 320 and includes reference data 314 and single user writable data 315. Although the client interactive logic component 313 may be on the same machine or local area network as the primary logic component 312, the service provider architecture described herein allows the client interactive component 313 to be executed remotely from the primary logic component 312 as desired. For example, the client interactive logic component 313 may be located on the same Web farm, local area network, or even the same machine as the client 320, even though the client 320 is remotely located from the primary logic component 312.

The reference data is based on the current data as the current data existed at a previous instant in time. The reference data may have fields that are derived from one or more fields of the current data as the current data previously existed at that time, as well as fields that are replicated from the current data as the current data previously existed at that time.

As the primary logic component 312 provides services, the current data will change accordingly. For example, if a client orders a bookcase from a furniture provider, the inventory amount for that bookcase will be decremented by one in the current data to reflect the new available amount of bookcases. However, the reference data is not also updated every time the current data changes. Therefore, depending on how often the current data changes, and depending on how long it has been since the last reference data update occurred, the reference data may be relatively stale. This is in contrast to the conventional configuration in which the reference data is updated frequently as the data would need to be if the primary logic component is expecting requests to include data that is relatively current.

While interacting with the client 320, the client interactive logic component 313 will often present some or all of the reference data to the client. For example, if the reference data is a listing of available products for purchase through the service provider, the client may display the list to the user.

Also while interacting with the client, the client interactive logic component 313 receives single user writable data from the client, the data being specific to the client. Such data is often termed "shopping cart" data since the items within the shopping cart are customer specific and since the customer controls the items that are put in the shopping cart. The shopping cart data might include, for example, the personal information about the client's user such as name and address, any selections that the client may have made, billing information such as credit card number and expiration date, and any other client specific information that may assist the service provider in fulfilling a client request for a service.

The client interactive logic component 313 engages in two-way communication with the client 320 and with the primary logic component 312. Essentially, any form of two-way communication will suffice for use with the architecture of FIG. 3. However, it is preferred that such two-way communication be reliable. By way of example, and not limitation, such a reliable two-way communication may be a mechanism referred to herein as a "dialog." The details of a "dialog" are described below with respect to FIG. 6.

Figure 4:
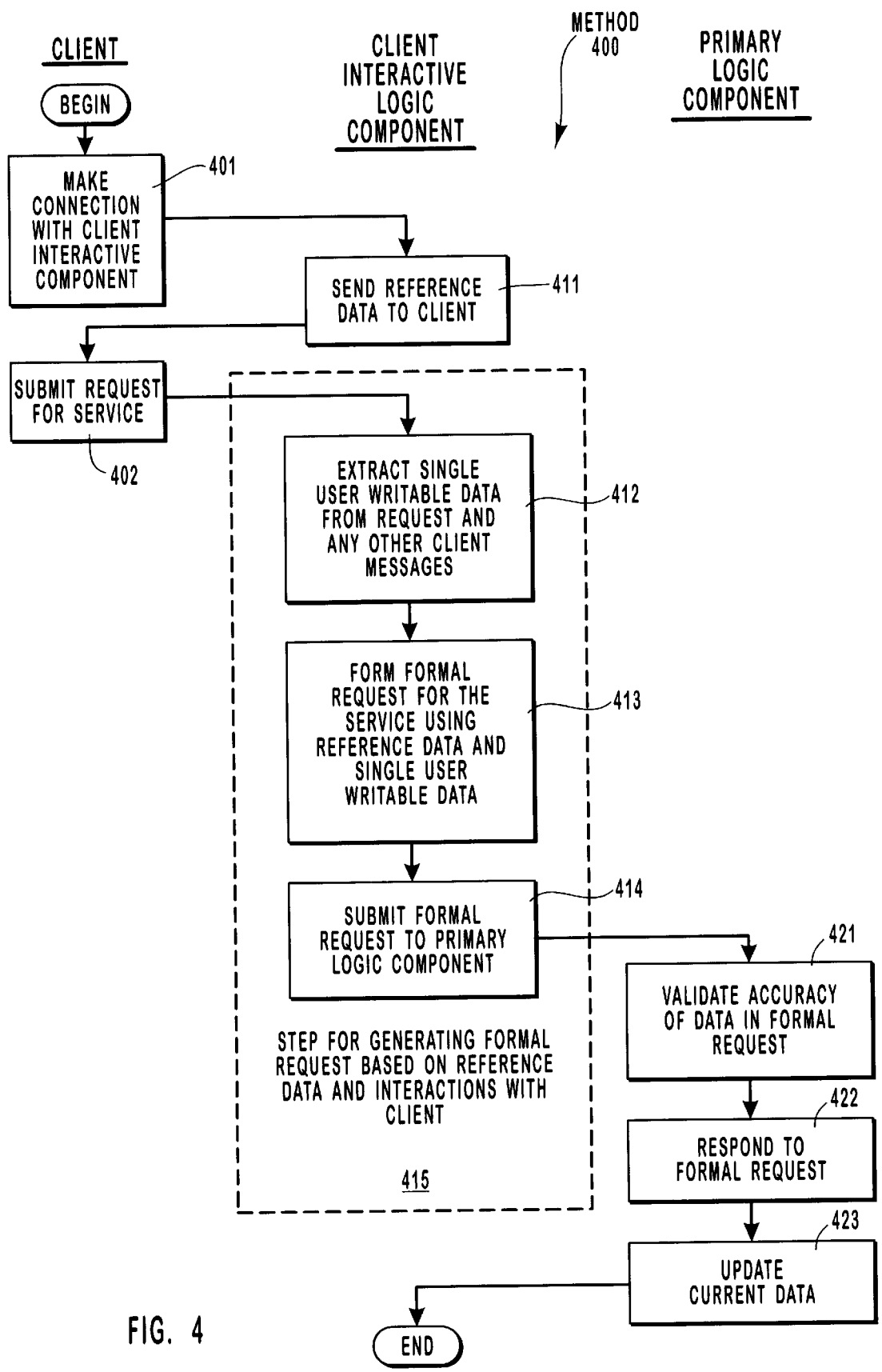
FIG. 4 illustrates a flowchart of a method of the service provider responding to a client request.

FIG. 4 illustrates a flowchart of a method 400 of the service provider responding to a client request for a service. The method 400 will be described with frequent reference to the architecture of FIG. 3. The client, client interactive logic component, and primary logic component are all involved with some of the acts corresponding to the method 400. Acts performed by the client are listed in the left column of FIG. 4 under the heading "CLIENT". Acts performed by the client interactive logic component are listed in the center column of FIG. 4 under the heading "CLIENT INTERACTIVE LOGIC COMPONENT". Acts performed by the primary logic component are listed in the right column of FIG. 4 under the heading "PRIMARY LOGIC COMPONENT".

Initially, the client 320 establishes a connection with the client interactive logic component 313 in act 401. Note that although the connection is listed under an act performed by the client, the establishment of a connection often involves the cooperation of both nodes to the connection. In this case, the client interactive logic component 313 will also be involved with establishing a connection. In this description and in the claims, a "connection" between the client and the client interactive logic component includes any means of communicating whether a session is involved or not. The communication may be via messaging as is often the case if the client and client interactive logic component are remotely located, or may be by the client calling functions exposed by the client interactive logic component if they are more closely located perhaps in the same system memory of a client machine.

As mentioned above, the client interactive logic component 313 maintains reference data 314 that is based on the current data 311 as the current data existed at a previous instant in time. The reference data is periodically updated using a one-way communication from the primary logic component 312 to one or more client interactive logic components 313. Essentially any form of one-way communication will suffice for use with the present invention. However, it is preferred that the one-way communication be reliable. One method of reliably implementing the one-way publication of reference data from a primary logic component to one or more client interactive logic components is called herein "monolog." The details of "monolog" are described below with respect to FIG. 7.

Referring to FIG. 4, after the client establishes a connection with the client interactive logic component (act 401), the client interactive logic component sends at least a portion of the reference data to the client (act 411). The client reviews the reference data to learn of the services offered by service provider 300. For example, if the service provider is an on-line merchant, the reference data might include an inventory of products for sale.

The client 320 then submits a request for service (act 402). This client may have generated the request by relying on the reference data provided to the client. For example, if the reference data includes a list of bicycles for sale. The client may click on a graphic of the bicycle and select a button entitled "Add to Shopping Cart." As the user proceeds through the transaction, the user may also include personal information such as name, credit card number, credit card expiration date, and other per-user information that is relevant to the transaction.

After interacting with the client, embodiments within the scope of the present invention include a step for the client interactive logic component generating a formal request based on interaction with the client and based on the reference data (step 415), the formal request being in a format recognized by the primary logic component 312. Although any corresponding acts for accomplishing this step will suffice, FIG. 4 shows an embodiment in which corresponding acts 412, 413 and 414 are used to accomplish the step.

Specifically, the client interactive logic component extracts single user writable data from the at least one message received from the client (act 412). A "message" in this description and in the claims may be in the form of input parameters to a callable function. Next, the client interactive logic component forms the formal request using reference data and single user writable data (act 413). Specifically, the formal request includes fields either replicated from corresponding fields in the reference data or single user writable data, or includes fields that are derived from one or more fields of the reference data and/or single user writable data. The client interactive logic component 313 submits the formal request to the primary logic component 312 (act 414). This submission may be through messaging or may be through function calling as appropriate for the relationship between the client interactive logic component 313 and the primary logic component 312.

The primary logic component 312 then validates the accuracy of the data included in the request (act 421). In so doing, the primary logic component does not rely on the client interactive logic component functioning properly. Thus, a trust boundary is established between the primary logic component 312 and the client interactive logic component 313 allowing the primary logic component to be autonomous from the client interactive logic component, and vice versa. This trust boundary allows for more flexibility in how the client interactive logic component relates to the primary logic component. The primary logic component then responds to the formal request (act 422) and updates the current data (act 423).

The flexibility in the relationship between the client interactive logic component 313 and the primary logic component 312 is further enhanced by allowing for formal requests that are based on stale reference data to be granted. Since the reference data may be stale, the reference data need not be updated as often. Therefore, the bandwidth of the communication link between the client interactive logic component 313 and the primary logic component 312 need not be so demanding. This allows for more flexibility in the communication link between the primary and client interactive logic components thus allowing for more flexibility in the relationship between the primary and client interactive logic components.

The reference data may be permitted to be stale by having the client interactive logic component generate commutative requests and requests that are based on the business functions provided by the primary logic component. The reference data may also be permitted to be stale by the primary logic component accounting for a degree of staleness in the reference data when deciding whether to grant or deny the formal request. Each of these methodologies that permit for staleness in the reference data will now be described in further detail.

The client interactive device 313 optionally generates formal requests that are commutative. In other words, the requests specify the desired service in an abstract manner. This gives the primary logic component flexibility on how to fulfill the request. Furthermore, this allows for requests to be fulfilled in any order while reducing the chanced that a request will be denied. It also allows provides an effective way of dealing with stale data as will be demonstrated from the following example.

First demonstrated is the effect of generating requests that are not commutative. Assume that User A and User B want to stay at the same hotel on the same night and both prefer non-smoking bedrooms with a king size bed. The hotel has eight such rooms available for that night including rooms 301 through 308. User A first makes a successful request to book room 301 and the primary logic component updates the current data to reflect this booking. The reference data at the client interactive logic component associated with User B does not yet have the update reflecting this booking and is thus somewhat stale. Therefore, User B will still think that room 301 is available based on the reference data. User B then makes a request for room 301. The primary logic component, of course, denies this request due to lack of availability even though similar rooms 302 through 308 are available.

Most users have no preference of one non-smoking room with a king size bed over another. Thus, a non-smoking room with a king size bed may be viewed as being a generally fungible resource where one non-smoking room with a king size bed is as good as another. In this light, suppose that instead of generating a request for room 301, User A (and the associated client interactive logic component) makes a request for a non-smoking room with a king size bed. The primary computer system grants the request and tentatively sets aside room 301, although any of rooms 302 through 308 would do just as well.

Now suppose that User B and her husband had their honeymoon in room 301. Room 301 has sentimental value to User B. Since the reference data associated with User B is stale and does not reflect the booking of room 301, User B thus makes a specific request for room 301. The primary logic component determines that there is a conflict and thus reorders the request to see if it may satisfy the more specific request first. Since User A's request was commutative, it may be reordered after User B's request without affecting User A's expectations (unless User A happened to get the last available non-smoking room with a king size bed). Thus, room 301 is first allocated to User B and one of the remaining non-smoking rooms with a king size bed is allocated to User A. Both users had their requests fulfilled because User A's request was commutative or reorderable.

Note that if User B had not had the specific preference for room 301, User B may have also generated a commutative request for a non-smoking room with a king size bed. That would improve the options for reordering and thus increase the chance of a successful fulfillment of as many requests as possible. This commutativity allows for requests to be reordered if a conflict exists with satisfying the requests in a particular order. These conflicts may arise due to staleness of the reference data. Thus, having the client interactive logic device form commutative requests increases the ability of the service provider to deal with stale reference data.

Commutative requests may be formed by aligning the request more closely with the business function of the service provider, and removing items having to do with the implementation details. In this description and in the claims, a "business function" is a function that a service provider performs when interfacing with a client. For example, in the above on-line hotel reservation example, the service provider is in the business of making hotel reservations. The client is not concerned about specifying what vacuum cleaner is used to clean the hotel room, or what the fine print in the contract with the hotel worker's union specifies. The client is typically only concerned with getting a hotel room that meets certain broad parameters such as bed size, smoking versus non-smoking, and the like. The client is typically not concerned with what the room number is going to be. Thus, the commutative, business-oriented, request is going to be for a non-smoking room with a king size bed. Similarly, when order a bicycle, one might request the model number and color of the bicycle, but will not specify the desired serial number identifying the exact bicycle unit.

To further assist in handling stale data, the primary logic component 312 may be configured to tolerate a reasonable degree of staleness in the reference data that is included in the formal request. For example, suppose that the primary logic component updates reference data every week. The primary logic component may be configured to tolerate staleness in reference data that is at least one week old so as to account for the updates only occurring once a week. To reject reference data that is less than a week stale would result in the primary logic component 312 not honoring its own statements. The primary logic component may tolerate staleness that is two or even three times or more the length of the average time between updates to minimize the chance of denying requests based on legitimate, but stale data.

Staleness in data may be measured by the length of time between the current time and the prior instant in time that the reference data is based on. This length of time may be one hour, one day, one week, one month, or even more. Staleness may also be measured by the percentage of replicated fields in the reference data that is different from the corresponding fields in the current data. This percentage may be 0.01, 0.1, one, five, ten, twenty-five or even more.

By allowing the primary logic component 312 to be autonomous from the client interactive logic component 313 and by allowing for the reference data to be stale, there is great flexibility in the relationship between the primary logic component and the client interactive logic component without even changing the underlying code of the client interactive logic component or the primary logic component. The client interactive logic component may be run on the same machine or local network as the primary logic component, on a Web farm associated with the client, on the same local area network as the client or even on the same machine as the client without changing the code of the client interactive logic component. Thus, the client interactive logic component may be downloaded from a server and run local to the client as desired since the primary logic component is not constrained by having to trust the client interactive logic component or update the reference data frequently.

Furthermore, since the network service configuration tolerates staleness and the client interactive logic component running on the same machine as the client, the network service configuration provides for more flexible off line applications. The only constraint in this off line case, is that the reference data cannot be updated during the off line period. Also, formal requests are queued for transmission during the next on line period.

Figure 5:
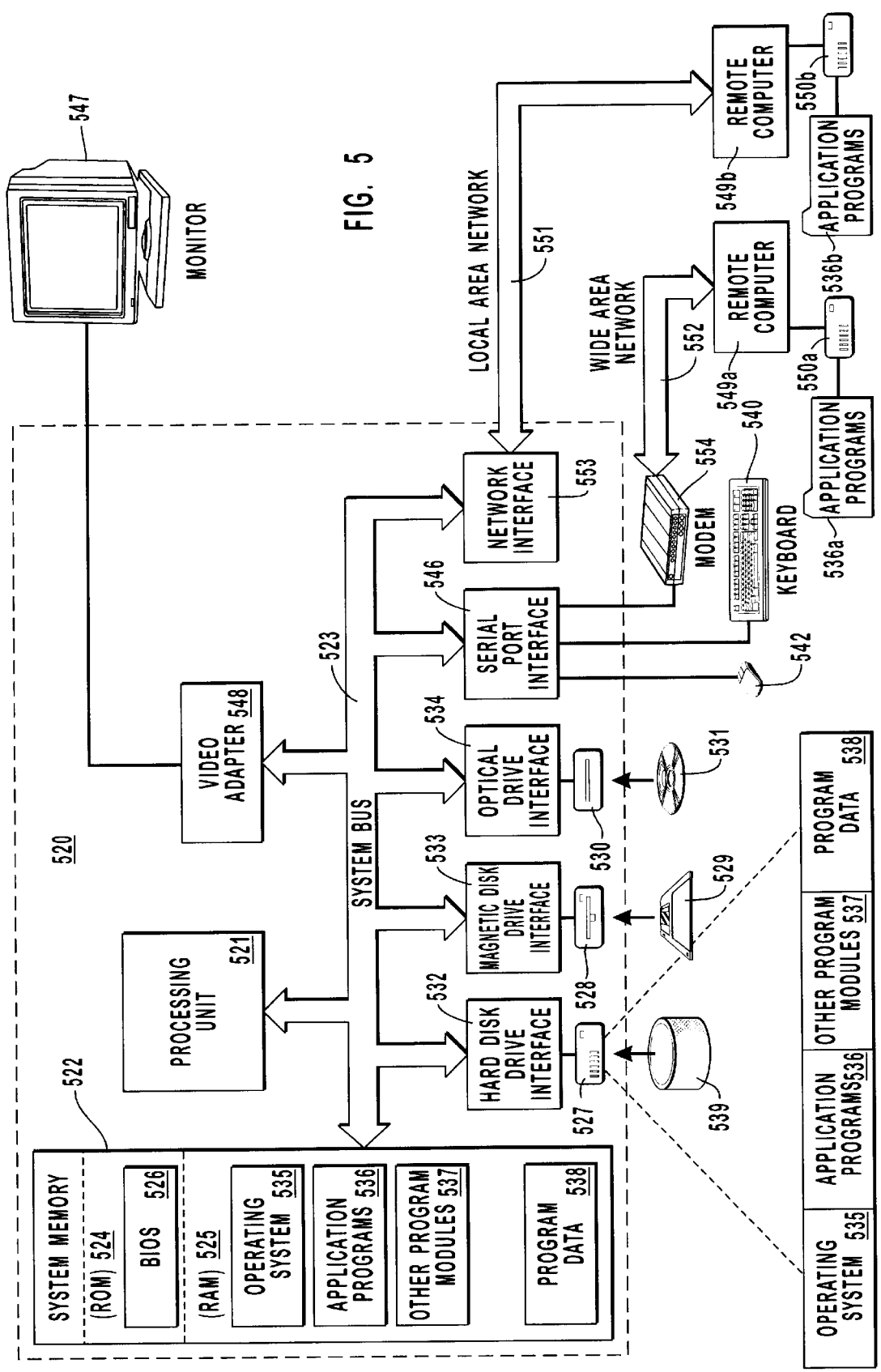
FIG. 5 illustrates a suitable architecture in which the present invention may be implemented.

Having described the preferred embodiments of the present invention and the advantages as compared to the conventional state of the art, an exemplary system for implementing the invention will be described with respect to FIG. 5. FIG. 5 includes a general purpose computing device in the form of a conventional computer 520. The conventional computing device 520 may be used to implement the client 320 and in some cases that client interactive logic component 313. The conventional computing device 520 may also be used to implement the server that executes the primary logic component 312. However, as is often the case, servers may be absent user interface devices such as keyboard 540, pointing device 542, and monitor 547 if the server does not directly interact with a user.

The computing device includes a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 operates in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

Figure 6:
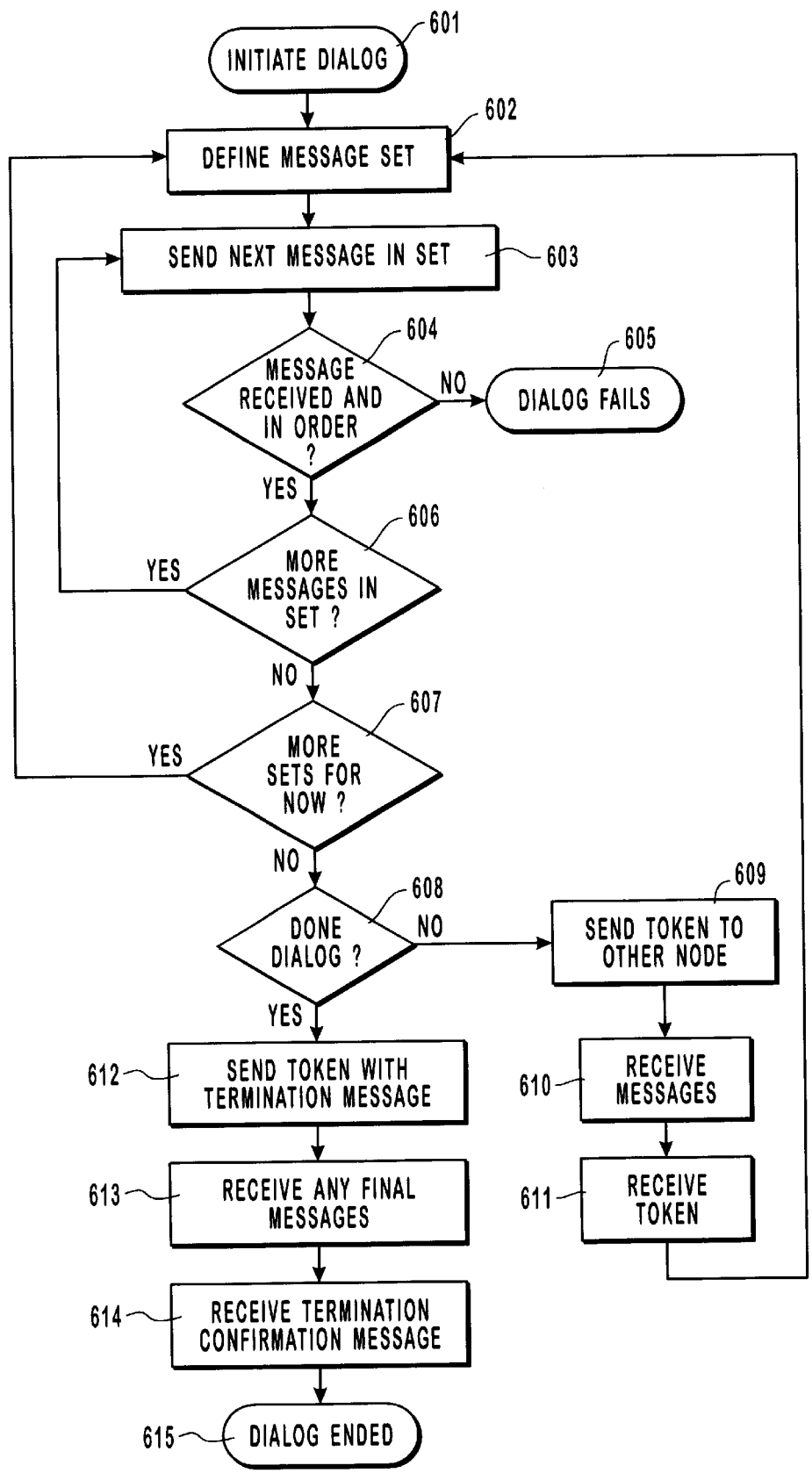
FIG. 6 illustrates a flowchart of a reliable way of performing two-way communications as between the client interactive logic component the client, or between the client interactive logic component and the primary logic component.

As mentioned above, the client interactive logic component may engage in a reliable two-way communication called herein a "dialog", which is a method for communicating between two nodes in a network. FIG. 6 illustrates a flowchart of a method 600 of engaging in a reliable two-way dialog from the viewpoint of the node initiating the dialog. In this method, delivery of a set of messages is guaranteed under transaction protection. Each message is either delivered exactly once or a defined action is taken such as notifying both nodes of the failure and terminating the dialog session. The dialog also provides for long running message exchange transactions that may even span months or years as is common in business transactions.

First, the dialog is initiated (act 601). This may involve the initiating node activating or calling a correspondent that includes a logic component (i.e., code and data) involved in the two-way communication. This correspondent then sends an initiation message to the other node informing the other node that the initiating node desires to begin a dialog. In response, the other node activates its own correspondent logic component. The correspondent logic components for each node then communicate with each other to facilitate communication between the two nodes.

Next, a set of messages to be transmitted is defined (act 602) along with ordering relationships between the messages in the set. The transmission of the message set then occurs. Specifically, the first message in the message set is sent (act 603). If the message is not received by the other node, or if the message is not received in its proper order (NO in decision block 604), then a predetermined event occurs. This event might include notifying both nodes of the failure or failing the dialog completely (act 605).

If the message is received at the other node and is received in order (YES in decision block 604), then the initiating node determines whether there are more messages in the message set to be transmitted (decision block 606). If there are more (YES in decision block 606), the next message in the message set is then transmitted (returning back to act 603). Act 603 and 604 are repeated for all messages in the message set unless one of the messages does not arrive at the other node in order in which case the dialog session fails (act 605). However, assuming that the dialog session does not fail, once all the messages in the current set are sent (NO in decision block 606), it is then determined whether there are more message sets to send (decision block 607). If so (YES in decision block 607), they are sent by repeating acts 602, 603, 604 and 606 until all the sets are sent (NO in decision block 607).

Once the one or more message sets have been sent, it is determined whether the initiating node wishes to terminate the dialog (decision block 608). If not (NO in decision block 608), a token is then sent to the other node (act 609), the token giving the other node the right to send message sets in the same manner as the initiating node sent message sets. After the initiating node has received all the message sets the other node desires to send (act 610), the initiating node then receives the token back from the other node (act 611). Acts 602, 603, 604, 606 and 607 are then repeated allowing the initiating node to send more message sets under transaction protection.

At some point, the dialog session is to end (YES in decision block 608). This may be, for example, because the other node sent a dialog termination message when it passed back the send token. It may also be because the initiating node has decided to end the dialog session. Thus, either node may cause the dialog session to terminate.

Suppose that the initiating node decides to end the dialog (YES in decision block 608). The initiating node would then send the send token back to the other node along with a termination message (act 612). The initiating node would then receive any final message sets from the other node (act 613). Once the other node has completed sending all of the final message sets, the initiating node receives a termination confirmation message (act 614) from the other node thus ending the dialog (act 615). Note the acts 612, 613 and 614 may also have been performed by the other node if the other node had decided to end the dialog. In that case, the initiating node would have generated the termination confirmation message.

Since these transactions of message sets may occur over a long period of time such as months or years, it may often be that one node or the other may experience a system failure during the transaction. Thus, the correspondent logic components at both ends are configured to save transaction data to a non-volatile memory location so that the transaction data accumulated to the point of the failure is not lost. This saving may occur when all of the messages in a message set are received thus allowing the message set to commit. At this time, that message set may then be saved into the non-volatile memory location. When the system restarts, the system is configured to start the correspondent and give the correspondent access to the transaction data durably stored in the non-volatile memory thus allowing the correspondent to continue with the transaction despite the failure.

In this manner, a dialog allows for entire message sets to be delivered exactly once (or else the dialog would fail) and in both directions between the nodes. Also, the exchanges may occur over long periods of time in which system failures may more likely fail during the exchange.

Also as mentioned above, the primary logic component provides reference data updates to each of the client interactive logic components. This may be accomplished by a reliable one-way communication mechanism called herein a "monolog" which is now described.

Figure 7:
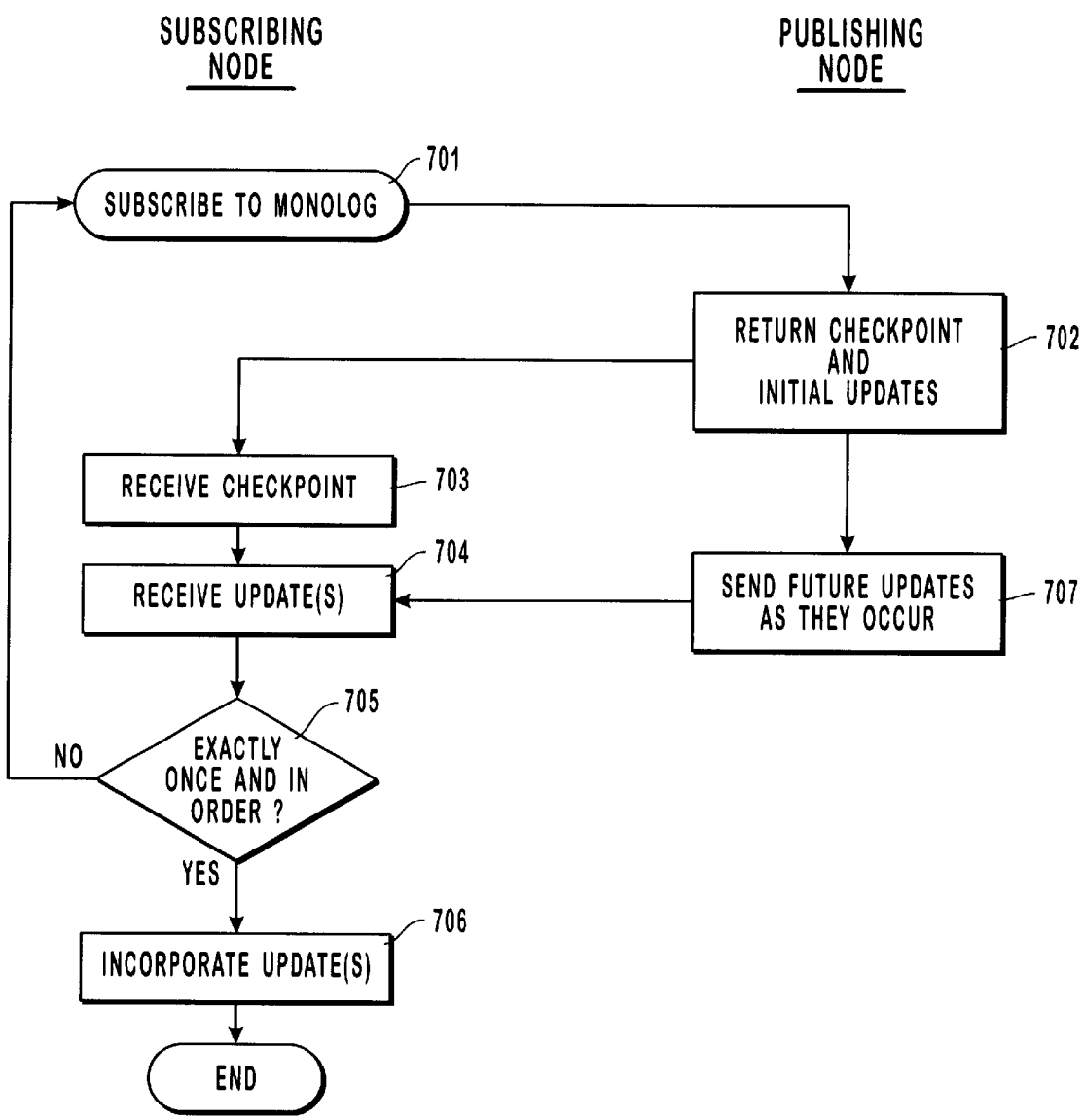
FIG. 7 illustrates a flowchart of a reliable way of performing one-way publication of information as from the primary logic component to the client interactive logic component.

Monolog allows for a publisher of data (in this case, the primary logic component) to publish data (in this case, reference data) to one or more subscribers (in this case, the client interactive logic components). FIG. 7 illustrates a flowchart of a method 700 of reliable one-way communication. Acts performed by the subscribing node are listed under the heading "SUBSCRIBING NODE" in the left column of FIG. 7. On the other hand, acts performed by the publishing node are listed under the heading "PUBLISHING NODE" in the right column of FIG. 7.

First, the subscribing node initiates the monolog (act 701) by sending a subscribe message to the publishing node. In response to this subscription, the subscribing node receives a monolog identifier. This monolog identifier is used to bind the correspondent of the subscribing node with the monolog so that when messages related to the monolog are received, the correspondent activates and receives the message. This correspondent includes data and code that survives system failures. Any data is periodically saved to non-volatile memory. During restart, the correspondent is activated and given access to the non-volatile data. Thus, the monolog survives system failures that might likely occur over a long period of time.

In response to the subscription, the publishing node sends a "checkpoint" back to the subscribing node (act 702). The checkpoint represents the state of the publication as it existing at a prior instant in time. Only the most recent checkpoint is used to help bring each subscription up-to-date since using the most recent checkpoint will reduce the amount of updates needed to be incorporated into the checkpoint. Although only one checkpoint is used for each subscription, the publishing node will continue to issue new checkpoints on a periodic basis so that a recent checkpoint may be used for subsequent subscriptions as well. As checkpoints age, they may ultimately be cleared from the memory of the publishing node. Thus, the publishing node constantly creates new checkpoints and deletes old checkpoints.

The checkpoint may include one or more ordered messages which, when integrated, form the state of the publication at that prior instant in time. The publishing node also sends update messages (act 702) which include all the sequential updates to the published data that occurred between the time of the checkpoint and the current time. These sequential updates include data that may be compared to the old state of the publication data at the subscribing node to form a new state of the publication data. The update message is thus relatively small since it only communicates changes rather than the entire new state of the publication data.

If any of the messages in the checkpoint or in the updates do not arrive exactly once or arrives out of order, (NO in decision block 705), then a predetermined event occurs. This predetermined event may include notifying the subscribing node that the monolog has failed. It may also include the subscribing node cleaning up from the monolog and re-subscribing to the monolog (returning to act 701). If all messages arrived exactly once and in order, the updates are incorporated (act 706). If at any point during the subscription life, future updates to the published data occur, these updates are also sent to the subscribing node (act 707). These updates are also incorporated (act 706) if they arrive exactly once and in order. Thus, the monolog method of one-way communication allows for reliable one-way communication of data such as publication data in which messages are guaranteed to arrive exactly once and in order. Also, the one-way communication is efficient since smaller updates are sent to the subscribing node.

The one-way communications is also able to efficiently cope with failure. For example, as mentioned above, if the messages do not arrive exactly once or arrive out of order (NO in decision block 705), the method restarts by having the subscribing node re-subscribe to the monolog (act 701). This time around, however, the publishing node may return a more up-to-date checkpoint than the checkpoint used for the prior subscription. Using the more up-to-date checkpoint reduces the amount of update messages needed to bring the subscribing node up-to-date.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network having a service provider configuration and a plurality of client computer systems, the server provider including a primary logic component that manages access to current data, the service provider also including at least one client interactive logic component that interacts with at least one of the client computer systems, a method of the client interactive logic component interfacing with the client computer system and with the primary logic component in a manner that allows the primary logic component to be autonomous from the client interactive device thereby allowing for more flexible connection options between the client interactive device and the primary logic component, the method comprising the following:

a specific act of maintaining reference data that is based on the current data as the current data existed at a previous instant in time;

a specific act of receiving at least one message from the client computer system, the at least one message including a client request for a service offered by the service provider;

a specific act of extracting single user writable data from the at least one message received from the client computer system;

a specific act of formulating a formal request for the service using the reference data and the single user writable data, the formal request being according to a format recognized by the primary logic component; and a specific act of submitting the formal request to the primary logic component for validation of the accuracy of the information within the formal request, the primary logic component not trusting the accuracy of the information within the formal request provided by the client interactive logic component.

2. A method in accordance with claim 1, wherein the specific act of formulating a formal request comprises a specific act of forming a commutative request, the commutative request being reorderable in a sequence of requests when such reordering would increase the number of requests that the primary logic component would fulfill.

3. A method in accordance with claim 2, wherein the commutative request is for a business function provided by the service provider.

4. A method in accordance with claim 1, wherein there is an average time period between receiving consecutive updates of the reference data at the client interactive logic component.

5. A method in accordance with claim 4, wherein the primary logic component is configured to accept formal requests that are based on reference data that is at least as old as the average time period between consecutive updates, wherein denial of requests due to staleness of the reference data is reduced.

6. A method in accordance with claim 4, wherein the primary logic component is configured to accept formal requests that are based on reference data that is at least twice as old as the average time period between consecutive updates, wherein denial of requests due to staleness of the reference data is reduced.

7. A method in accordance with claim 1, wherein the updates of the reference data are provided by an exactly once, in order protocol in which the updates are delivered exactly once, and in order, or a predetermined event occurs.

8. A method in accordance with claim 7, wherein the predetermined event includes notifying the client interactive logic component of a failure to deliver an update exactly once and in order.

9. A method in accordance with claim 8, wherein the client interactive logic component subscribes to the reference data in order to receive periodic updates to the reference data.

10. A method in accordance with claim 9, wherein when the client interactive logic component subscribes to the reference data, the primary logic component sends the reference data as it existed at a checkpoint prior instant in time back to the client interactive component, the primary logic component also sending updates of the reference data back to the client interactive logic component.

11. A method in accordance with claim 10, wherein the updates each include changes to the state of the reference data that occurred after the checkpoint prior instant in time, the updates when incorporated sequentially into the reference data, causing the reference data to be sequentially updated.

12. A method in accordance with claim 11, wherein the updates include changes to the reference data rather than entire new versions of the reference data.

13. A method in accordance with claim 1, wherein the specific act of receiving at least one message from the client computer system includes a specific act of interacting in a two-way communication with the client computer system.

14. A method in accordance with claim 13, wherein the two-way communication is implemented by an exactly once, in order protocol in which the messages are delivered exactly once, and in order, or a predetermined event occurs.

15. A method in accordance with claim 14, wherein the predetermined event includes notifying the client interactive logic component and the client of a failure to deliver message exactly once and in order.

16. A method in accordance with claim 1, wherein the reference data is at least one hour stale as compared to the current data.

17. A method in accordance with claim 1, wherein the reference data is at least one day stale as compared to the current data.

18. A method in accordance with claim 1, wherein the reference data is at least one week stale as compared to the current data.

19. A method in accordance with claim 1, wherein the reference data is at least one month stale as compared to the current data.

20. A method in accordance with claim 1, wherein the reference data includes fields replicated from the current data.

21. A method in accordance with claim 20, wherein at least 0.01 percent of the replicated fields of the reference data differ from the corresponding fields in the current data due to staleness.

22. A method in accordance with claim 20, wherein at least 0.1 percent of the replicated fields of the reference data differ from the corresponding fields in the current data due to staleness.

23. A method in accordance with claim 20, wherein at least one percent of the replicated fields of the reference data differ from the corresponding fields in the current data due to staleness.

24. A method in accordance with claim 20, wherein at least five percent of the replicated fields of the reference data differs from the corresponding fields in the current data due to staleness.

25. A method in accordance with claim 20, wherein at least ten percent of the replicated fields of the reference data differs from the corresponding fields in the current data due to staleness.

26. A method in accordance with claim 20, wherein at least twenty five percent of the replicated fields of the reference data differs from the corresponding fields in the current data due to staleness.

27. A network system for efficiently providing a service to a client, the network system comprising the following:
   a client that submits a request for service to a service provider;
   a service provider that provides the requested service to the client, the service provider comprising the following:
      a primary logic component that manages access to a current data source that stores current data of the service provider;
      a client interactive logic component that performs the following:
         a) interacts with the client,
         b) stores reference data that is based on the current data as the current data previously existed,
         c) stores single user writable data that include data extracted from interactions with the client,
         d) formulates formal requests using the reference data and the single user writable data, and
         e) transmits the formal request to the primary logic component, wherein the primary logic component validates the accuracy of the information within the formal request, the primary logic component not trusting the accuracy of the information within the formal request.

28. A network system in accordance with claim 27, wherein the client interactive logic component and the primary logic component are not located on the same machine or in the same local area network.

29. In a network having a service provider configuration and a plurality of client computer systems, the server provider including a primary logic component that manages access to current data, the service provider also including at least one client interactive logic component that interacts with at least one of the client computer systems, a method of the client interactive logic component interfacing with the client computer system and with the primary logic component in a manner that allows the primary logic component to be autonomous from the client interactive device thereby allowing for more flexible connection options between the client interactive device and the primary logic component, the method comprising the following:
   a specific act of maintaining reference data that is based on the current data as the current data existed at a previous instant in time;
   a step for generating formal request based on interactions with the client computer system and based on the reference data, the formal request being according to the format recognized by the primary logic component; and
   a specific act of submitting the formal request to the primary logic component for validation of the accuracy of the information within the formal request, the primary logic component not trusting the accuracy of information provided by the client interactive logic component.

30. A method in accordance with claim 29, wherein the step for generating formal request based on interactions with the client computer system and based on the reference data comprises the following:
   a specific act of receiving at least one message from the client computer system, the at least one message including a client request for a service offered by the service provider;
   a specific act of extracting single user writable data from the at least one message received from the client computer system;
   a specific act of formulating a formal request for the service using the reference data and the single user writable data, the formal request being according to a format recognized by the primary logic component.

31. A computer program product for use in a network having a service provider configuration and a plurality of client computer systems, the server provider including a primary logic component that manages access to current data, the service provider also including at least one client interactive logic component that interacts with at least one of the client computer systems, the computer program product for implementing a method of the client interactive logic component interfacing with the client computer system and with the primary logic component in a manner that allows the primary logic component to be autonomous from the client interactive device thereby allowing for more flexible connection options between the client interactive device and the primary logic component, the computer program product including a computer-readable medium having stored thereon the following:
   computer-executable instructions for performing a specific act of reading at least one message received from the client computer system, the at least one message including a client request for a service offered by the service provider;
   computer-executable instructions for performing a specific act of extracting single user writable data from the at least one message received from the client computer system;

computer-executable instructions for performing a specific act of formulating a formal request for the service using the single user writable data and reference data that is based on the current data as the current data existed at a previous instant in time; and computer-executable instructions for performing a specific act of causing the formal request to be submitted to the primary logic component for validation of the accuracy of the information within the formal request, the primary logic component not trusting the accuracy of the information within the formal request provided by the client interactive logic component.

32. A computer program product in accordance with claim 31, wherein the computer-executable instructions for performing the specific act of formulating a formal request comprise computer-executable instructions for performing a specific act of forming a commutative request, the commutative request being reorderable in a sequence of requests when such reordering would increase the number of requests that the primary logic component would fulfill.

33. A computer program product in accordance with claim 31, wherein the commutative request is for a business function provided by the service provider.

34. In a network having a service provider configuration and a plurality of client computer systems, the server provider including a primary logic component that manages access to current data, the service provider also including at least one client interactive logic component that interacts with at least one of the client computer systems, a method of the client interactive logic component interfacing with the client computer system and with the primary logic component in a manner that allows the primary logic component to be autonomous from the client interactive device thereby allowing for more flexible connection options between the client interactive device and the primary logic component, the method comprising the following:

a specific act of maintaining reference data that is based on the current data as the current data existed at a prior instant in time;

a specific act of receiving at least one message from the client computer system, the at least one message including a client request for a service offered by the service provider;

a specific act of extracting single user writable data from the at least one message received from the client computer system;

a specific act of formulating a formal request for the service using the reference data and the single user writable data, the formal request being according to the format recognized by the primary logic component; and a specific act of submitting the formal request to the primary logic component.

35. A method in accordance with claim 34, wherein the reference data includes fields replicated from the current data.

36. A method in accordance with claim 35, wherein at least 0.01 percent of the replicated fields of the reference data differ from the corresponding fields in the current data due to staleness.

37. A method in accordance with claim 35, wherein at least 0.1 percent of the replicated fields of the reference data differ from the corresponding fields in the current data due to staleness.

38. A method in accordance with claim 35, wherein at least one percent of the replicated fields of the reference data differ from the corresponding fields in the current data due to staleness.

39. A method in accordance with claim 35, wherein at least five percent of the replicated fields of the reference data differs from the corresponding fields in the current data due to staleness.

40. A method in accordance with claim 35, wherein at least ten percent of the replicated fields of the reference data differs from the corresponding fields in the current data due to staleness.

41. A method in accordance with claim 35, wherein at least twenty five percent of the replicated fields of the reference data differs from the corresponding fields in the current data due to staleness.

42. A computer program product for use in a network having a service provider configuration and a plurality of client computer systems, the server provider including a primary logic component that manages access to current data, the service provider also including at least one client interactive logic component that interacts with at least one of the client computer systems, the computer program product for implementing a method of the client interactive logic component interfacing with the client computer system and with the primary logic component in a manner that allows the primary logic component to be autonomous from the client interactive device thereby allowing for more flexible connection options between the client interactive device and the primary logic component, the computer program product including a computer-readable medium having stored thereon the following:

computer-executable instructions for performing a specific act of reading at least one message received from the client computer system, the at least one message including a client request for a service offered by the service provider;

computer-executable instructions for performing a specific act of extracting single user writable data from the at least one message received from the client computer system;

computer-executable instructions for performing a specific act of formulating a formal request for the service using the single user writable data and reference data that is based on the current data as the current data existed at a prior instant in time; and computer-executable instructions for performing a specific act of causing the formal request to be submitted to the primary logic component.

43. The computer program product in accordance with claim 42, wherein the computer-readable medium further stores the reference data.

44. A computer program product in accordance with claim 43, wherein the reference data includes fields replicated from the current data.

45. A computer program product in accordance with claim 44, wherein at least 0.01 percent of the replicated fields of the reference data differ from the corresponding fields in the current data due to staleness.

46. A computer program product in accordance with claim 44, wherein at least 0.1 percent of the replicated fields of the reference data differ from the corresponding fields in the current data due to staleness.

47. A computer program product in accordance with claim 44, wherein at least one percent of the replicated fields of the reference data differ from the corresponding fields in the current data due to staleness.

48. A computer program product in accordance with claim 44, wherein at least five percent of the replicated fields of the reference data differs from the corresponding fields in the current data due to staleness.

49. A computer program product in accordance with claim 44, wherein at least ten percent of the replicated fields of the reference data differs from the corresponding fields in the current data due to staleness.

50. A computer program product in accordance with claim 44, wherein at least twenty five percent of the replicated fields of the reference data differs from the corresponding fields in the current data due to staleness.

51. In a network having a service provider configuration and a plurality of client computer systems, the server provider including a primary logic component that manages access to current data, the service provider also including at least one client interactive logic component that interacts with at least one of the client computer systems, a method of the client interactive logic component interfacing with the client computer system and with the primary logic component in a manner that allows the primary logic component to be autonomous from the client interactive device thereby allowing for more flexible connection options between the client interactive device and the primary logic component, the method comprising the following:

a specific act of maintaining reference data that is based on the current data as the current data existed at a previous instant in time;

a specific act of receiving at least one message from the client computer system, the at least one message including a client request for a service offered by the service provider;

a specific act of extracting single user writable data from the at least one message received from the client computer system;

a specific act of formulating a formal request for the service using the reference data and the single user writable data, the formal request being according to the format recognized by the primary logic component, the formal request also being commutative so that it is reorderable with other requests to improve the service providers ability to response to the formal request and to the other requests; and a specific act of submitting the formal request to the primary logic component.

52. A method in accordance with claim 51, wherein the commutative request is for a business function provided by the service provider.

53. A computer program product for use in a network having a service provider configuration and a plurality of client computer systems, the server provider including a primary logic component that manages access to current data, the service provider also including at least one client interactive logic component that interacts with at least one of the client computer systems, the computer program product for implementing a method of the client interactive logic component interfacing with the client computer system and with the primary logic component in a manner that allows the primary logic component to be autonomous from the client interactive device thereby allowing for more flexible connection options between the client interactive device and the primary logic component, the computer program product including a computer-readable medium having stored thereon the following:

computer-executable instructions for performing a specific act of reading at least one message received from the client computer system, the at least one message including a client request for a service offered by the service provider;

computer-executable instructions for performing a specific act of extracting single user writable data from the at least one message received from the client computer system;

computer-executable instructions for performing a specific act of formulating a formal request for the service using the single user writable data and reference data that is based on the current data as the current data existed at a previous instant in time, the formal request being commutative so that it is reorderable with other requests to improve the service providers ability to response to the formal request and to the other requests; and computer-executable instructions for performing a specific act of causing the formal request to be submitted to the primary logic component.

54. A computer program product in accordance with claim 53, wherein the commutative request is for a business function provided by the service provider.

55. In a network having a service provider configuration and a plurality of client computer systems, the server provider including a primary logic component that manages access to current data, the service provider also including at least one client interactive logic component that interacts with at least one of the client computer systems, a method of the client interactive logic component interfacing with the client computer system and with the primary logic component in a manner that allows the primary logic component to be autonomous from the client interactive device thereby allowing for more flexible connection options between the client interactive device and the primary logic component, the method comprising the following:

a specific act of maintaining reference data that is based on the current data as the current data existed at a previous instant in time;

a specific act of receiving at least one message from the client computer system, the at least one message including a client request for a service offered by the service provider;

a specific act of extracting single user writable data from the at least one message received from the client computer system;

a specific act of formulating a formal request for the service using the reference data and the single user writable data, the formal request being according to the format recognized by the primary logic component; and a specific act of submitting the formal request to the primary logic component, wherein the client interactive logic component may run on either the same machine as the same server that runs the primary logic component, in an intermediate server such as a Web farm between the primary logic component and the client computer system, in a front end machine, or even in an offline machine without changing the code of the client interactive logic component.

* * * * *